US008661916B2

(12) United States Patent
Hose von Wolfframsdorff et al.

(10) Patent No.: US 8,661,916 B2
(45) Date of Patent: Mar. 4, 2014

(54) LOAD CELL FOR SENSING SUPPORTING FORCES IN A SUPPORT ELEMENT

(75) Inventors: Joachim Hose von Wolfframsdorff, Alsbach-Haehnlein (DE); Oliver Jost, Langen (DE); Klaus Haerle, Hergensweiler (DE); Stefan Amendt, Roellbach (DE)

(73) Assignee: TECSIS GmbH, Offenbach am Main (DE)

( * ) Notice: Subject to any disclaimer, the term of this patent is extended or adjusted under 35 U.S.C. 154(b) by 637 days.

(21) Appl. No.: 12/753,276

(22) Filed: Apr. 2, 2010

(65) Prior Publication Data
US 2010/0251831 A1     Oct. 7, 2010

(30) Foreign Application Priority Data
Apr. 3, 2009   (DE) .......................... 10 2009 002 188

(51) Int. Cl.
*G01L 1/22* (2006.01)
(52) U.S. Cl.
USPC .................................................. 73/862.045
(58) Field of Classification Search
USPC ..................... 73/862.627, 862.045
See application file for complete search history.

(56) References Cited

U.S. PATENT DOCUMENTS

| | | | | |
|---|---|---|---|---|
| 3,645,136 A | * | 2/1972 | Calhoun | 73/708 |
| 3,736,795 A | * | 6/1973 | Andersson | 73/862.632 |
| 3,772,912 A | * | 11/1973 | Andersson | 73/862.629 |
| 4,267,724 A | * | 5/1981 | Spoor | 73/862.628 |
| 4,589,291 A | * | 5/1986 | Sander | 73/862.627 |
| 4,688,434 A | * | 8/1987 | Cherbuy | 73/862.622 |
| 5,024,107 A | * | 6/1991 | Bethe | 73/862.622 |
| 5,076,376 A | * | 12/1991 | Bizet et al. | 177/229 |
| 7,698,963 B2 | * | 4/2010 | Herhaus | 73/862.633 |
| 7,832,290 B2 | * | 11/2010 | Hose-Von Wolfframsdorff et al. | 73/862.627 |

* cited by examiner

*Primary Examiner* — Lisa Caputo
*Assistant Examiner* — Octavia Davis-Hollington
(74) *Attorney, Agent, or Firm* — Baker & Hostetler LLP

(57) ABSTRACT

A load cell for detecting the supporting force transmitted by a load-bearing support element is provided. The load cell forms a measuring portion of the support element, which deforms under the supporting force and transverse forces in a direction deviating from the supporting force to form part of the support element with the same. A plurality of thin-film resistors are arranged at the measuring portion, and exhibit a reaction proportional to strain and whose reactions proportional to transverse forces cancel each other.

20 Claims, 6 Drawing Sheets

LOAD CELL FOR SENSING SUPPORTING FORCES IN A SUPPORT ELEMENT

CROSS-REFERENCE TO RELATED APPLICATIONS

This application claims priority to foreign Patent Application DE 10 2009 002 188.4, filed on Apr. 3, 2009, the disclosure of which is incorporated herein by reference in its entirety.

FIELD OF THE INVENTION

The invention relates to a load cell for detecting supporting forces in a support element, especially for use in crane vehicles, mobile hoisting gear, mobile drilling units, self-propelled gun carriages or the like.

BACKGROUND OF THE INVENTION

In FIG. 1 a crane vehicle is schematically illustrated which is put on support legs a serving as support element to safeguard the stand during operation. The support elements a are usually provided at the end of telescopic carriers b secured to the base frame c of the vehicle. At the site of the crane the entire vehicle is hydraulically lifted with the aid of the support elements. The vehicle wheels are not in contact with the ground.

When the forces transmitted vertically into the ground via the support elements, the weight distribution and, consequently, the center of gravity of the vehicle, in particular upon lifting a load, can be determined, and this is useful, in turn, to determine the tilting point of the crane.

One possibility of measuring the supporting forces consists in positioning a load cell in the flow of force of each support element. Said load cell then transmits a signal corresponding to the respective supporting force which is evaluated, for instance, in the afore-mentioned manner.

When lifting the vehicle by the support elements and when lifting a load, vehicle frames, telescopic carriers and support elements deform such that the ends or support legs of the support elements standing on the ground tend to move apart from each other in horizontal direction d, as illustrated in FIG. 2. This movement is partly prevented by the fact, however, that the friction coefficient between the ground and the support leg a is not zero. In this way horizontal reaction forces are formed between the support elements which generate bending moments in all components through which the flow of force is passed.

The problem in terms of measuring consists in the fact that any real load cell does not only react in the direction of force for which it is designed but more or less also to forces and moments in all other directions acting upon the same. For instance, in order to detect the position of the center of gravity of the vehicle or crane supported by the support elements merely the vertical forces, namely the supporting forces are relevant, however.

The horizontal forces occurring in the above-described application at the individual support elements amount to a maximum of 20% of the vertical forces to be measured.

The more distant the load cells are positioned from the end of the support legs on the ground, the more the bending moments increase due to the path of bending moments in the loaded parts. If load cells are arranged close to the ground-side end of the support elements, soiling of the support elements is particularly strong and might damage sensitive measuring instruments.

SUMMARY OF THE INVENTION

Embodiments of the present invention advantageously provide a robust load cell for a support element which supplies a signal corresponding to the load borne by the support element, i.e. the supporting force, which can be easily mounted to the end of the support leg, which it is little influenced by transverse forces and moments, and which is capable of withstanding environmental influences such as moisture and dirt.

For embodiments of the present invention directed to safety-related applications, it is important that the measuring characteristics of the load cell remain constant over a long period of time and the minimum requirements to functional safety are met.

Furthermore, those vehicles equipped with support legs are usually employed outdoors. There, for instance, one vehicle side may be in the sun so that the support legs at this side grow warm, while the other support legs are in the shade. Thus, considerable differences in temperature can result which may falsify the measured resistance values (i.e. forces) in the load cell.

Advantageously, the load cell can carry additional temperature-sensitive resistors which compensate the temperature directly at the load cell. It is especially advantageous when the sensor carrying the load measuring resistors also includes the temperature measuring resistors in direct vicinity thereto. There are many different vehicles including attachments that require the use of support legs. As a consequence, also different maximum vertical loads are to be expected and detected at the support legs. In order to permit an exact measurement via the respective nominal load range, the load cell should be designed so that it is adapted, where possible, to transmit a signal varying in a uniform manner in the entire nominal load range.

In order to avoid stockpiling of a plurality of different sensors each of which is adapted to a respective nominal load range, it is of advantage if one single standard sensor is used and the geometry of the deformation member of the load cell is adapted to the measuring task, i.e. to the nominal load range. This adaptation by way of the configuration of the deformation member can be excellently calculated as well as manufactured, because preferably diameters of a rotary member (cylindrical diameter) are adapted, which can be easily and accurately put into practice.

Accordingly, embodiments of the present invention provide a load cell for detecting the supporting force transmitted by a load-bearing support element. The load cell forms a measuring portion of the support element, which deforms under the supporting force and transverse forces in a direction deviating from the supporting force to form part of the support element with the same. A plurality of thin-film resistors are arranged at the measuring portion, and exhibit a reaction proportional to strain and whose reactions proportional to transverse forces cancel each other.

BRIEF DESCRIPTION OF THE DRAWINGS

Embodiments of the invention will be described in detail hereinafter with reference to the schematic drawing, in which.

DETAILED DESCRIPTION

Figure 1:
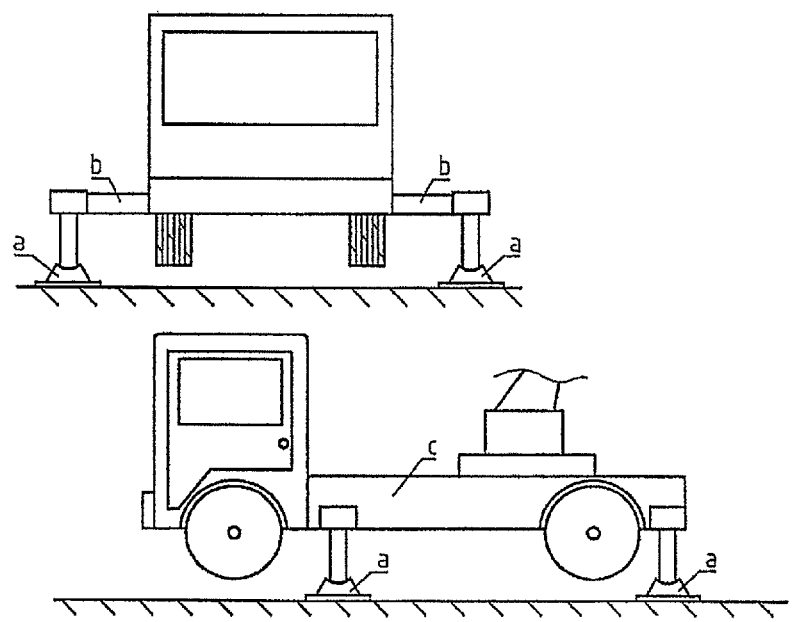
FIG. 1 shows a crane truck lifted by support elements in a front view and a side view.
Figure 2:
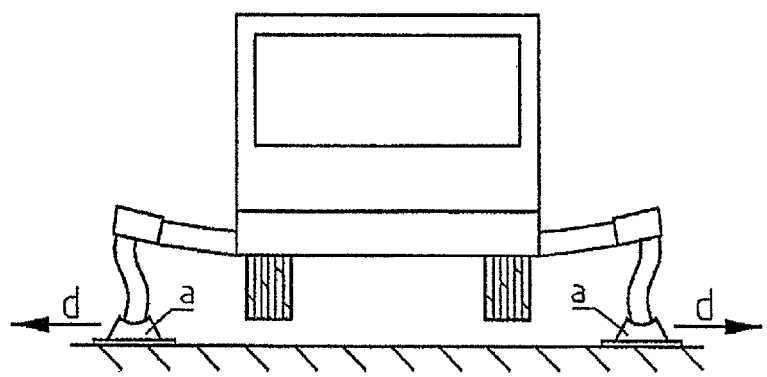
FIG. 2 schematically shows the occurring deformations.
Figure 3:
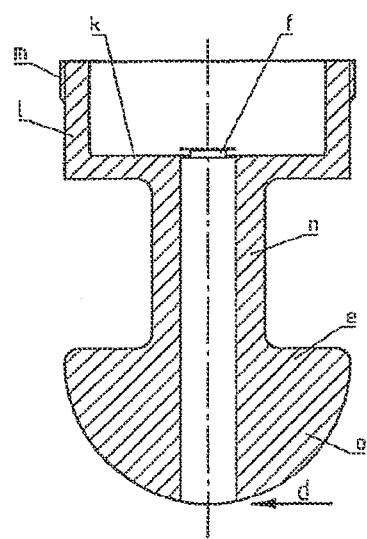
FIG. 3 shows a deformation member as measuring portion of a support element.

In accordance with FIG. 3, an embodiment of the load cell includes a rust-proof deformation member e made of steel the strain of which caused by the force to be measured is not detected by strain gauges glued onto the member but with the aid of strain-sensitive resistors manufactured by thin-film technology. This has the advantage of high long-term stability, as the thin-film resistors manufactured by thin-film technology are not glued on but are adhesively sputtered onto a carrier member as atomic compound.

Figure 4A:
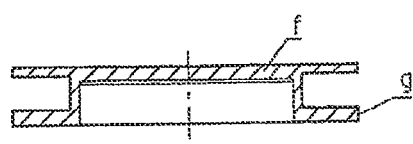
FIG. 4 shows a carrier member to be welded to the deformation member according to FIG. 3 including thin-film resistors thereon.
Figure 4B:
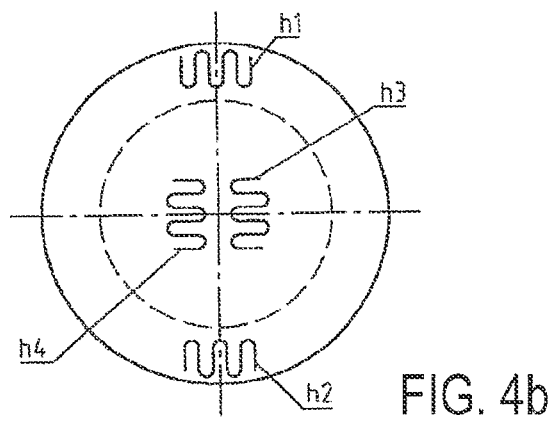

According to FIG. 4a, 4b, the thin-film resistors are provided on the end face of the flat cylindrical carrier member f initially separated from the load cell whose material corresponds to the material of the deforming member or at least exhibits a similar heat expansion. During the manufacturing process of the load cell the carrier member is adhesively joined to the deformation member at its outer edge g with the aid of a welding laser or by electron beam welding.

The number of the thin-film resistors h on the carrier member is at least two, in the shown example it is four. They are interconnected to form a Wheatstone bridge i.

In order to obtain a higher functional safety also two or more similarly interconnected Wheatstone bridges can be provided on the carrier member, the signals thereof being evaluated separately from each other and being assessed in an electronic comparator circuit.

Furthermore, temperature-dependent resistors that compensate both the thermal effect on zero of the output signal i and on the margin of the output signal i are directly provided on the carrier member. The position of said resistors which is locally very close to the thin-film resistors brings about a rapid compensation in the case of temperature variations.

The position of the carrier member within the deformation member is selected such that no disturbing measuring effect occurs when the load cell is loaded by the afore-mentioned horizontal forces d and the moments occurring thereby. This is achieved by the fact that the strains which are also transmitted into the carrier member and thus variations of resistance in the thin-film resistors are removed by the electric interconnection in the bridge circuit. An effect to be measured solely occurs in the case of a vertical load of the load cell.

The embodiment of the deforming member preferred in this case is, in its basic shape, a disk-shaped membrane k whose center exhibits a cylindrical bore in which the cylindrical carrier member f is provided. The outer edge of the membrane is transformed into a hollow cylinder l at the outer end of which preferably a thread m permitting securing to the support element is arranged. The inner edge of the membrane is shaped into a thick-walled long hollow cylinder n the end of which preferably terminates in a semi-spherical thickening o that permits mounting the support leg which produces the connection to the ground at any angular positions, which is necessary in the case of uneven ground.

Figure 6:
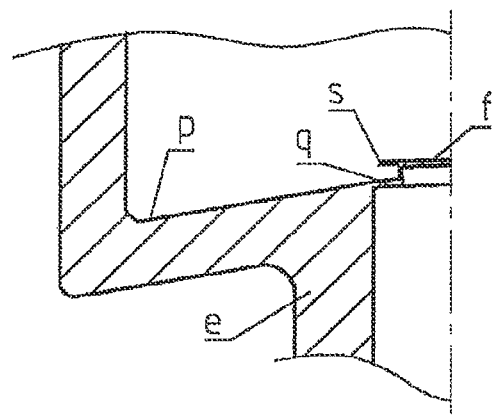
FIG. 6 is a sectional view to illustrate a detail of the deformation member.

As shown in FIG. 6, the vertically acting force causes a lowering of the outer membrane edge p vis-à-vis the inner edge q and results in radial and tangential strains spaced equally in terms of rotation symmetry over the entire membrane diameter. These strains propagate also within the carrier member f and there entail corresponding radial and tangential strains which are converted into the electric signal change t via the thin-film resistors h.

Two out of the four thin-film resistors (e.g., FIG. 4b) h1 and h2 are provided in the vicinity of the outer edge s of the end face of the carrier member f and are strained when vertical force is applied so that their resistance is increased. The two other thin-film resistors h3 and h4 are adjacent to the center of the carrier member f and are upset when vertical force is applied so that their resistance is reduced.

Figure 7:
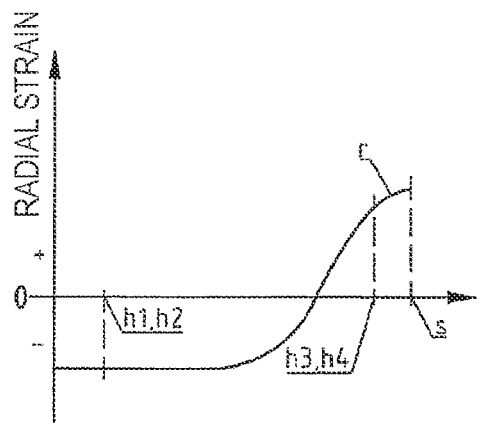
FIG. 7 is a diagram to explain the connection of strain and signal of individual thin-film resistors.

The basic course of radial strain r and the deformation in the carrier member are illustrated in FIG. 7.

Figure 5:
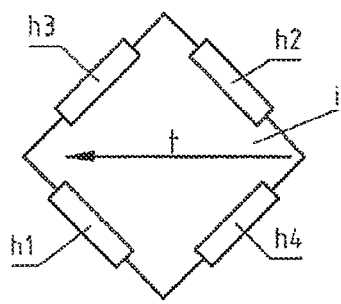
FIG. 5 shows an exemplary circuit of the thin-film resistors.

The interconnection of the resistors to form the Wheatstone bridge is shown in FIG. 5.

A horizontal force introduced to the load cell via the support leg results in a deformation of the membrane and the carrier member. In contrast to the strains occurring when vertical force is applied, the locations where the two outer thin-film resistors are positioned as well as the two locations where the two inner thin-film resistors are positioned now experience opposed strains.

Figure 8:
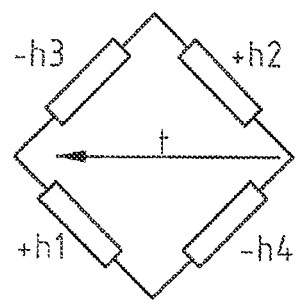
FIG. 8 shows a further exemplary circuit of the thin-film resistors.
Figure 9:
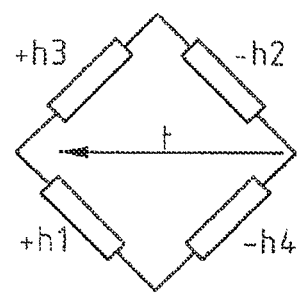
FIG. 9 shows another exemplary circuit of the thin-film resistors.

One embodiment of the thin-film resistors on the carrier member is shown in FIG. 4b. These respective equal but opposed strain variations effectuate that at the output of the Wheatstone bridge no variation of voltage t is resulting and thus no measuring error is caused by horizontal forces and moments generated thereby. The direction of variation of the resistance of the thin-film resistors of the Wheatstone bridge is basically shown for this case in FIG. 9 by the characters "+" and "−". In FIG. 8 the direction of variation of the resistance of the thin-film resistors of the Wheatstone bridge when loaded by a vertical load is basically shown by the characters "+" and "−".

Depending on the direction of the horizontal forces more or less great variations in pairs of the thin-film resistors h1, h2 and h3, h4 are resulting. However, in the case of the disturbing horizontal forces they are always directed in opposite direction so that no change of the bridge output signal t is resulting.

Figure 10:
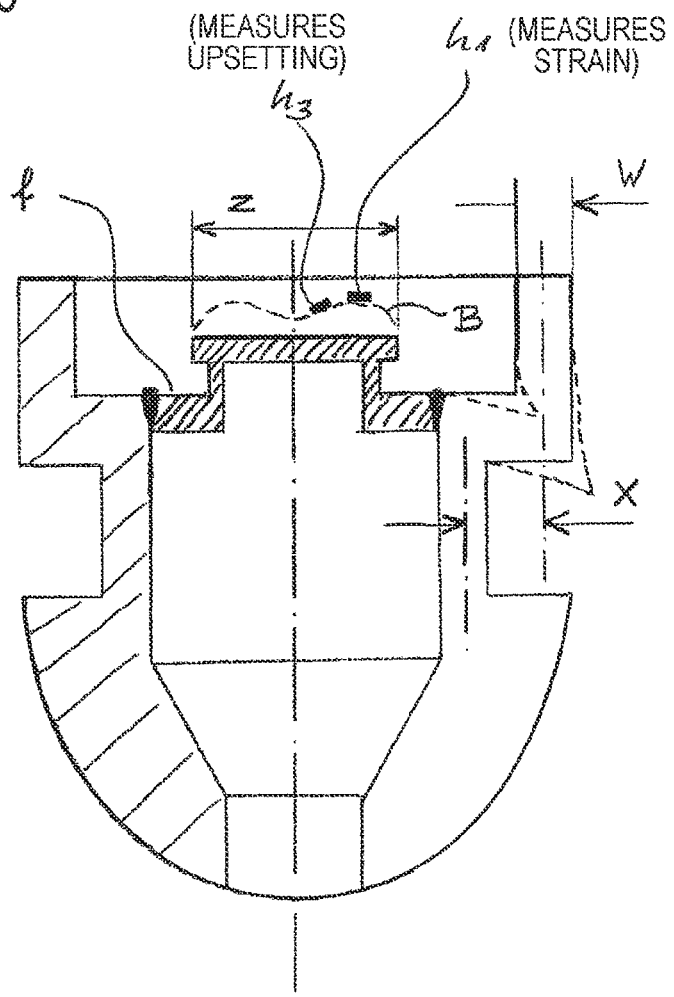
FIG. 10 is a schematic sectional view of a deformation member including bending lines.

FIG. 10 shows a schematic sectional view of a deformation member e including a carrier member f welded therein. The carrier member f symbolizes a sensor element which can also be an element completely ready for connection that is welded into the deformation member e at the welded seam v.

A bending line B illustrates in an exaggerated manner the deformation of the carrier member f when the deformation body e is loaded. A resistor h1 provided at a summit of the bending line B measures the rotation of the carrier member f, while a resistor h3 provided in a depression of the bending line B measures an upsetting. The entire load of the deformation member e can be concluded from these deformation values.

Figure 11:
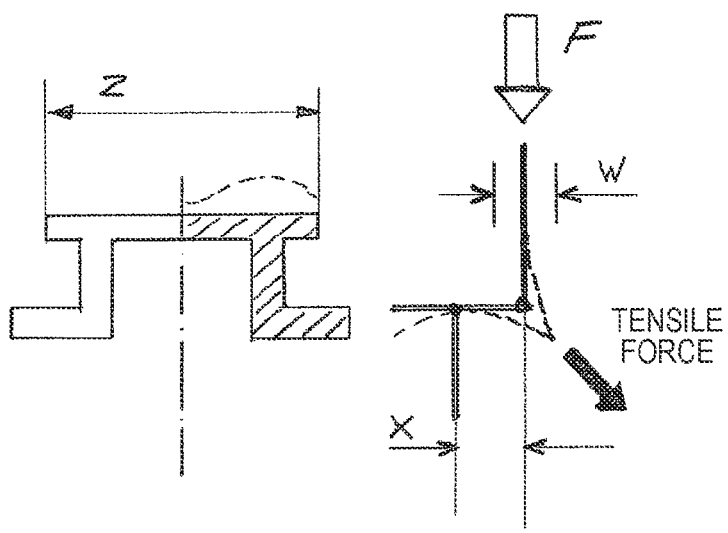
FIG. 11 is a sketch to explain the adaptation of the deformation member to the measuring task.

If a sensor element constantly identical in construction is to be used as a standard sensor element for load cells for different nominal loads, the deformation member e can be dimensioned, with the aid of the example shown in FIG. 11 by varying the wall thickness W and the lever arm X with Z remaining constant, such that the measuring range of the standard sensor element is exhausted. The measuring range of the standard sensor element is to be exhausted in such manner that the sensor element outputs its maximum signal when the deformation member is loaded by the nominal load. In this way, a signal having an at least nearly maximum resolution can be obtained by appropriately defining W and X over the entire operating load range of the respective load cell.

By the use of only one standard sensor element constantly identical in construction (which can also be stockpiled as a component ready for connection already) and the purely mechanical adaptation to the respective measuring task of the load cell it is possible to react to set nominal loads in a rapid and inexpensive manner.

Moreover, the standard sensor element in its entire behavior within the application range (i.e. the extent of deformations always remains constant; deformation only takes place with a different load) is very well known so that no further physical disturbances have to be taken into consideration which would have to be expected if the sensor was changed.

In the described manner the standard sensor element can be employed in nominal load range conditions of 1:20, i.e. load cells having nominal loads of 300 kN up to load cells having a nominal load of 6000 kN can be provided.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A load cell for detecting a supporting force transmitted by a load-bearing support element, the load cell forming a measuring portion of the support element and comprising:
   a plurality of thin-film resistors, arranged on one end face of a flat member of the measuring portion, for indicating a reaction proportional to strain, wherein the reaction is proportional to transverse forces of which cancel each other, and
   wherein the measuring portion deforms under the supporting force and the transverse forces in a direction deviating from the supporting force.

2. The load cell according to claim 1, wherein the plurality of thin-film resistors are connected to an evaluation unit for detecting resistances of each of the plurality of thin-film resistors and for generating a signal corresponding to a change of each thin-film resistor.

3. The load cell according to claim 2, wherein the evaluation unit offsets signals to be assigned to the measured transverse forces against each other in accordance with their sign.

4. The load cell according to claim 1, wherein the plurality of thin-film resistors are arranged at the measuring portion such that they are strained each in pairs in opposite direction in the case of transverse force and moment loading.

5. The load cell according to claim 4, wherein the plurality of thin-film resistors are arranged at the measuring portion such that they are strained each in pairs in opposite direction and to an equal amount in the case of transverse force and/or moment loading.

6. The load cell according to claim 1, wherein the plurality of thin-film resistors are formed on a carrier member.

7. The load cell according to claim 6, wherein the measuring portion comprises a deformation member, wherein the plurality of thin-film resistors are formed on an end face of the carrier member, and wherein the carrier member is welded to the deformation member.

8. The load cell according to claim 6, wherein the plurality of thin-film resistors are formed in a layer monolithically applied to the carrier member.

9. The load cell according to claim 6, wherein temperature-sensitive resistors applied to the carrier member are provided which compensate thermal effect on zero and a range of an output signal.

10. The load cell according to claim 6, wherein the measuring portion comprises a deformation member, and the carrier member forms a standard sensor element ready for connection having a welding flange that is welded onto the deformation member.

11. The load cell according to claim 10, wherein the carrier member of the standard sensor element carries temperature-sensitive resistors.

12. The load cell according to claim 10, wherein the deformation member deforms under a preset nominal load such that the standard sensor element transmits a signal of predetermined magnitude.

13. The load cell according to claim 12, wherein standard sensor elements of identical construction are adapted for use in differently dimensioned deformation members so as to provide load cells for different nominal load ranges.

14. The load cell according to claim 12, wherein load cells for nominal loads of from 300 to 6000 kN are provided by the standard sensor element of identical construction making use of adapted deformation members.

15. The load cell according to claim 1, wherein the measuring portion comprises a membrane-like deformation member to which a hollow cylinder is adjacent at one side at an outer membrane edge and to which a hollow cylinder or a solid cylinder is adjacent at another side at an inner membrane edge.

16. The load cell according to claim 15, wherein diameters or wall thicknesses of the two cylinders adjacent to the deformation member are adapted by a design of the deformation member.

17. The load cell according to claim 1, wherein the measuring portion comprises a deformation member made of a corrosion-resistant material.

18. The load cell according to claim 1, wherein the plurality of thin-film resistors are interconnected in a form of plural similar Wheatstone bridges output signals of which are separately evaluated and are assessed by an electronic comparator circuit.

19. The load cell according to claim 1, wherein the load cell is adapted for installation in support elements of at least one of the following: a mobile crane, lifting gear, drilling vehicle or a self-propelled gun carriage.

20. The load cell according to claim 1, wherein the plurality of thin-film resistors are glued to the measuring portion in a form of strain gauges.

* * * * *